United States Patent
Oka et al.

(10) Patent No.: US 8,768,410 B2
(45) Date of Patent: Jul. 1, 2014

(54) RADIO COMMUNICATION TERMINAL

(75) Inventors: Shinya Oka, Yokosuka (JP); Takashi Okada, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 233 days.

(21) Appl. No.: 13/511,296

(22) PCT Filed: Nov. 24, 2010

(86) PCT No.: PCT/JP2010/070909
§ 371 (c)(1),
(2), (4) Date: May 22, 2012

(87) PCT Pub. No.: WO2011/068061
PCT Pub. Date: Jun. 9, 2011

(65) Prior Publication Data
US 2012/0231751 A1    Sep. 13, 2012

(30) Foreign Application Priority Data

Dec. 3, 2009  (JP) ................................. 2009-275406

(51) Int. Cl.
*H04M 1/00*  (2006.01)
(52) U.S. Cl.
USPC .......... 455/553.1; 455/78; 455/73; 455/552.1
(58) Field of Classification Search
USPC ......... 455/553.1, 552.1, 78, 73; 375/260, 295
See application file for complete search history.

(56) References Cited

U.S. PATENT DOCUMENTS

| | | | | |
|---|---|---|---|---|
| 5,878,332 A | * | 3/1999 | Wang et al. ...................... | 455/84 |
| 6,006,112 A | * | 12/1999 | Rucki et al. .................... | 455/561 |
| 7,773,956 B2 | * | 8/2010 | Fukamachi et al. ............ | 455/78 |
| 8,009,725 B2 | * | 8/2011 | Petrovic et al. ................ | 375/220 |
| 8,077,656 B2 | * | 12/2011 | Korden et al. ................. | 370/328 |
| 8,315,577 B2 | * | 11/2012 | Kemmochi et al. ............. | 455/78 |
| 2003/0092398 A1 | * | 5/2003 | Uriu et al. ....................... | 455/83 |
| 2010/0099366 A1 | * | 4/2010 | Sugar et al. ..................... | 455/75 |

FOREIGN PATENT DOCUMENTS

| | | |
|---|---|---|
| JP | 09 238090 | 9/1997 |
| JP | 2000 517496 | 12/2000 |

OTHER PUBLICATIONS

3GPP TR 36.807 VO.1.0, $3^{rd}$ Generation Partnership Project; Technical Specification Group Radio Access Network; Evolved Universal Terrestrial Radio Access (E-UTRA); User Equipment (UE) radio transmission and reception; (Release 10), R4-103431, pp. 1-94. (Aug. 2010).

International Search Report issued on Dec. 21, 2010 in PCT/JP2010/070909 filed on Nov. 24, 2010.

* cited by examiner

*Primary Examiner* — Temesgh Ghebretinsae
*Assistant Examiner* — Raj Chakraborty
(74) *Attorney, Agent, or Firm* — Oblon, Spivak, McClelland, Maier & Neustadt, L.L.P.

(57) ABSTRACT

A mobile communication terminal (100) has a switch (140A) that switches to either a path (T2) that supplies a transmission signal from a modulator-demodulator circuit (200) to a transmitting and receiving antenna (101) via a transmission filter (110A) and via a notch filter (120A) or a path (T1) that supplies the transmission signal to transmitting and receiving antenna (101) via the transmission filter (110A) and a switch (140B) that switches to either a path (R2) that supplies a reception signal from transmitting and receiving antenna (101) to the modulator-demodulator circuit (200) via a reception filter (110B) and a notch filter (120B) or a path (R1) that supplies the reception signal to the modulator-demodulator circuit (200) via the reception filter (110B).

2 Claims, 5 Drawing Sheets

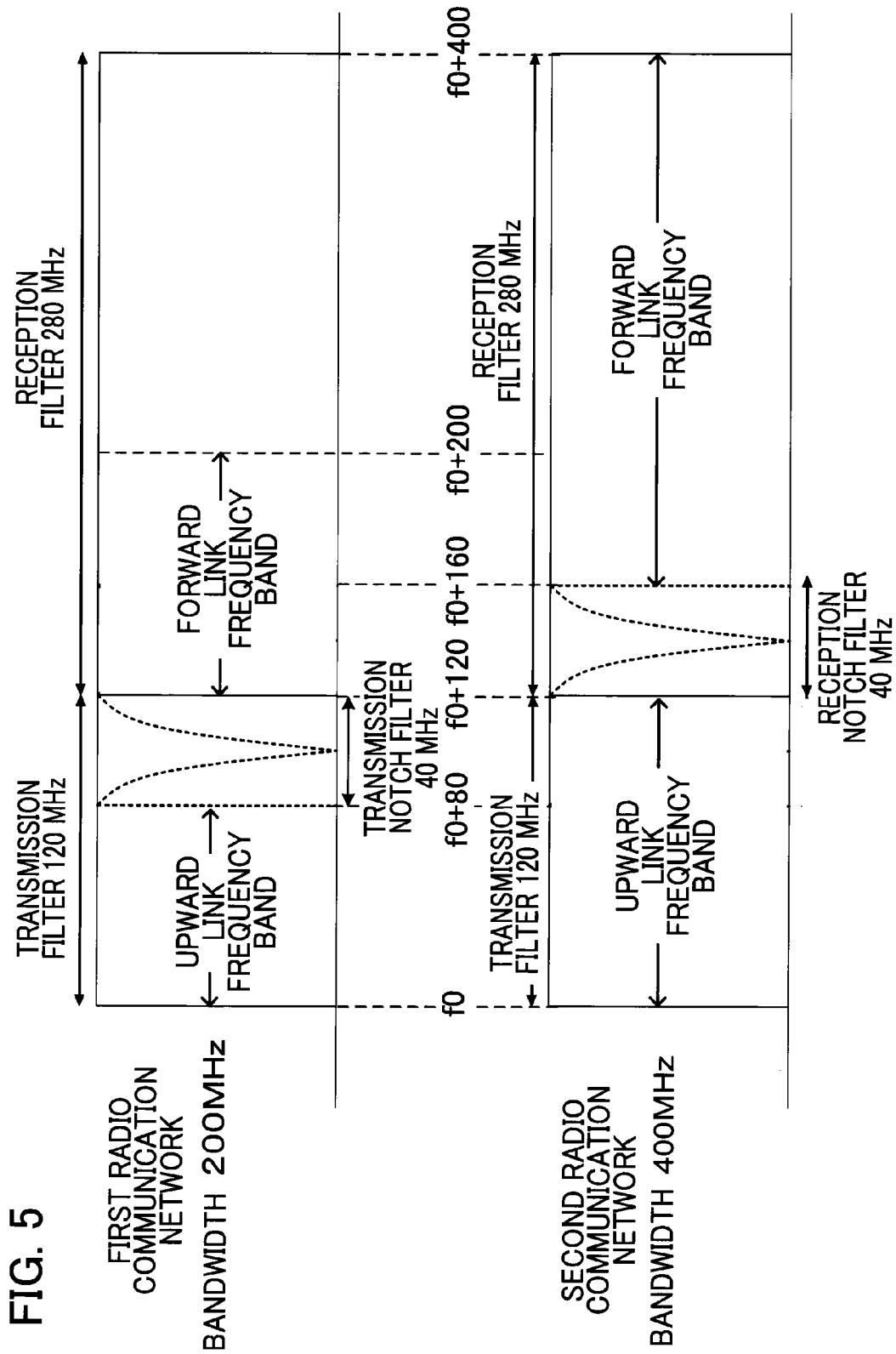

RADIO COMMUNICATION TERMINAL

TECHNICAL FIELD

The present invention relates to a radio communication terminal that transmits data over plural frequency bands and receives data over plural frequency bands.

BACKGROUND ART

A data communication service under third-generation mobile communication (IMT-2000: International Mobile Telecommunications-2000) is wide spread. As demand for ultra-high-speed large-capacity communication is rapidly increasing, the WRC (World Radiocommunication Conference) of the ITU (International Telecommunication Union) decided on frequency bands for IMT including the third-generation and the fourth-generation portable phones in 2007.

Depending on the results of future discussions at the ITU and 3GPP (Third Generation Partnership Project), a radio station could be required to be compatible with different frequency bandwidths differing depending on country and region. For example, a 200-MHz bandwidth partitioning and a 400-MHz bandwidth partitioning are being discussed as a bandwidth partitioning for LTE-Advanced (Long Term Evolution-Advanced), for which standardization is in progress for the fourth generation portable phone standard, IMT-Advanced (e.g., FIG. 1).

CITATION LIST

Patent Document

Patent Document 1: Published Japanese Translation No. 2000-517496 of the PCT International Publication

SUMMARY OF INVENTION

Technical Problem

When one tries to make a radio station that is compatible with frequency bands for upward link and forward link that are different from each other for two radio communication networks, a circuit configuration of the radio station would be such as shown in FIG. 2. In this radio station, a duplexer 3 for a first radio communication network and a duplexer 4 for a second radio communication network are arranged in a radio communication unit. Each duplexer 3,4 has a transmission bandpass filter and a reception bandpass filter. In this configuration, in a case in which the first radio communication network is used for communication, a transmission signal output from a modulator-demodulator circuit 6 is amplified by a power amplifier 5 for supply to duplexer 3 via a switch 2b, and is output from transmitting and receiving antenna 1. On the other hand, a reception signal from the first radio communication network received by transmitting and receiving antenna 1 is supplied to duplexer 3 via a switch 2a. A reception signal that has passed through this duplexer 3 is demodulated by modulator-demodulator circuit 6. On the other hand, in a case in which the second radio communication network is used for communication, a transmission signal output from modulator-demodulator circuit 6 is amplified by power amplifier 5, for supply to duplexer 4 via switch 2b, and is transmitted to the outside via transmitting and receiving antenna 1. On the other hand, a reception signal from the second radio communication network received by transmitting and receiving antenna 1 is supplied via a switch 2a to duplexer 4. A reception signal that has passed this duplexer 4 is demodulated at modulator-demodulator circuit 6. Thus, a duplexer (i.e., a pair of a transmission bandpass filter and a reception bandpass filter) is required for each network. Therefore, the circuit area of the radio communication unit increases in comparison with a radio station that is compatible with only one radio communication network.

As a conventional radio station, Patent Document 1 describes in FIG. 4 thereof a technique for providing two filters in a transmitter device that are switched depending on a network to communicate with and also providing two filters in a receiver device that are switched depending on a network. However, because a pair of a transmission bandpass filter and a reception bandpass filter is required for each network, the circuit area of the radio communication unit increases in comparison with a radio station that is compatible with only one radio communication network.

The present invention has, as its object, to provide a radio communication terminal compatible with two different radio communication networks for each of which an upward link frequency band and a forward link frequency band are different while minimizing increase in the circuit area.

Solution to Problem

A radio communication terminal according to the present invention is capable of generating a first upward link modulated transmission signal transmitted by a first upward link frequency belonging to a first upward link frequency band used for an upward link communication in a first radio communication network and capable of generating a second upward link modulated transmission signal transmitted by a second upward link frequency belonging to a second upward link frequency band used for an upward link communication in a second radio communication network, the second upward link frequency band including the entirety of the first upward link frequency band and an upward link non-overlapping frequency band differing from the first upward link frequency band, and the radio communication terminal has: a modulation unit; a transmitter antenna that transmits the first upward link modulated transmission signal and the second upward link modulated transmission signal; a transmission bandpass filter that passes a frequency component belonging to the second upward link frequency band; a transmission bandstop filter that attenuates a frequency component belonging to the upward link non-overlapping frequency band of the second upward link frequency band; a transmission switch that changes a path between the modulation unit and the transmitter antenna so that the first upward link modulated transmission signal is supplied to the transmitter antenna via the transmission bandpass filter and the transmission bandstop filter during communication with the first radio communication network and so that the second upward link modulated transmission signal is supplied to the transmitter antenna via the transmission bandpass filter during communication with the second radio communication network; a receiver antenna that receives a first forward link modulated reception signal modulated with a first forward link frequency belonging to a first forward link frequency band used for forward link communication in the first radio communication network and a second forward link modulated reception signal modulated with a second forward link frequency belonging to a second forward link frequency band used for forward link communication in the second radio communication network, the second forward link frequency band including a part of the first forward link frequency band and a forward link non-overlapping frequency band differing from the first forward link frequency band; a demodulation unit for generating a first reception signal by demodulating the first forward link modulated reception signal and for generating a second reception signal by demodulating the second forward link modulated reception signal; a reception bandpass filter that passes a frequency component belonging to the first forward link frequency band and a frequency component belonging to the second forward link frequency band; a reception bandstop filter that attenuates a frequency component belonging to the first forward link frequency band and not belonging to the second forward link frequency band; and a reception switch that changes a path between the receiver antenna and the demodulation unit so that the first forward link modulated reception signal is supplied to the demodulation unit via the reception bandpass filter during communication with the first radio communication network and so that the second forward link modulated reception signal is supplied to the demodulation unit via the reception bandpass filter and the reception bandstop filter during communication with the second radio communication network.

The present invention has a transmission bandpass filter and a transmission bandstop filter, and whether an upward link modulated transmission signal is supplied to a transmitter antenna after passing through both the transmission bandpass filter and the transmission bandstop filter or supplied to the transmitter antenna after passing through only the transmission bandpass filter can be switched by a transmission switch depending on whether communication is performed in the first or in the second radio communication network. Additionally, the present invention has a reception bandpass filter and a reception bandstop filter, and whether a forward link modulated reception signal is supplied to the demodulation unit after passing through both the reception bandpass filter and the reception bandstop filter or supplied to the demodulation unit after passing only through the reception bandpass filter can be switched by a reception switch depending on whether communication is performed in the first or in the second radio communication network. That is, according to the present invention, because a transmission bandpass filter and a reception bandpass filter are provided for use in common for overlapping bands for which frequency bands overlap between two radio communication networks using different frequency bands, the area of a radio communication unit can be reduced compared to a conventional configuration having two transmission bandpass filters and two reception bandpass filters. Therefore, while suppressing the increase in the circuit area of a radio communication unit, it is possible to provide a radio communication terminal compatible with two radio communication networks for each of which an upward link frequency band and a forward link frequency band are different.

According to a preferred embodiment of the present invention, at least one of the transmission bandstop filter and the reception bandstop filter may be a notch filter. Because a notch filter can be formed in a smaller area than a bandstop filter, a circuit area can be additionally reduced.

BRIEF DESCRIPTION OF THE DRAWINGS

FIG. 5 is a graph for explaining a frequency band passed by a transmission filter and a reception filter.

DESCRIPTION OF EMBODIMENTS

In the following, description will be given of an embodiment of the present invention.

Figure 1:
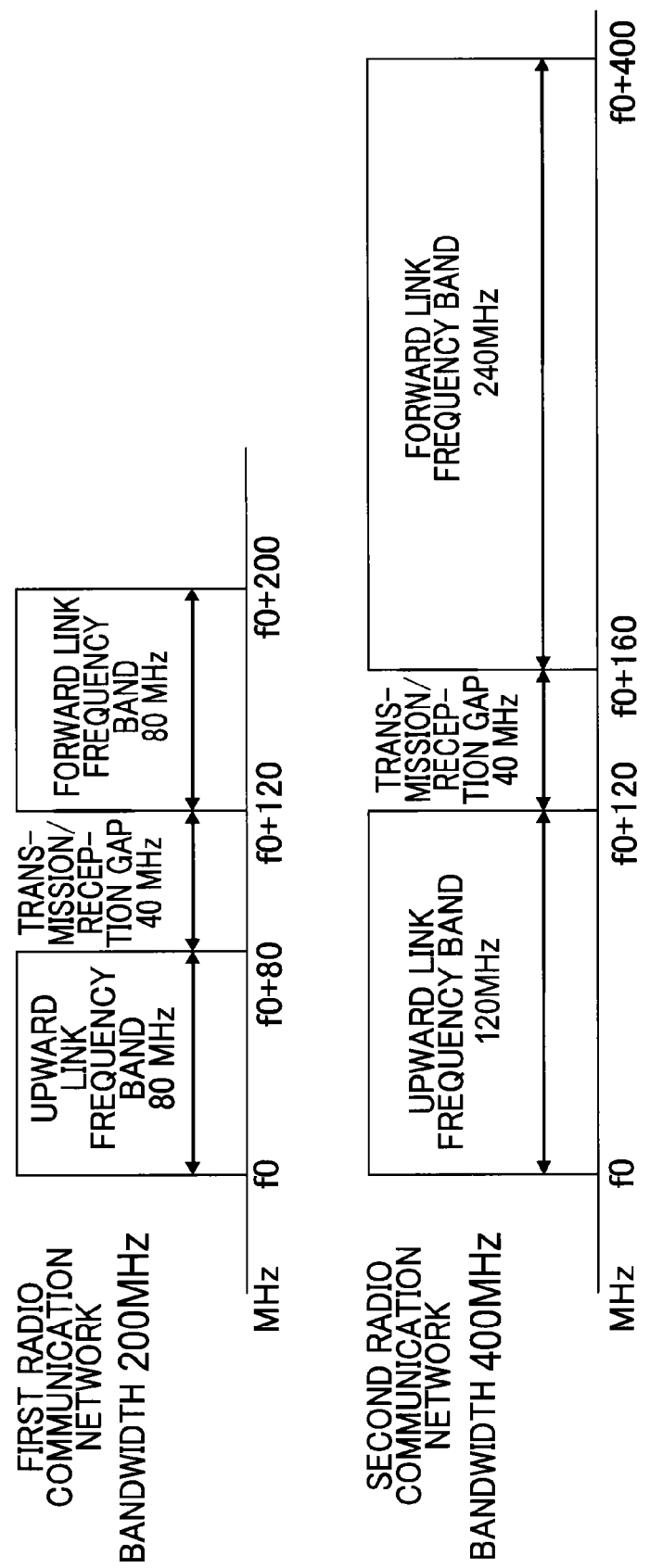
FIG. 1 shows an example of a bandwidth partitioning of frequency bands used in each of a first radio communication network and a second radio communication network.

FIG. 1 is a graph showing an example of a bandwidth partitioning of frequency bands used for a first radio communication network and a second radio communication network.

According to the present embodiment, we assume that the first radio communication network uses a 200-MHz-width frequency band of frequencies from [f0] to [f0+200] MHz, and the second radio communication network uses a 400-MHz-width frequency band of frequencies from [f0] to [f0+400] MHz. The first and second radio communication networks each provide a speech and data communication service for a later-described mobile communication terminal 100 (radio communication terminal) respectively in first and second countries or regions. Communication in each network is performed in accordance with an FDD system (Frequency Division Duplex system).

As shown in FIG. 1, in the first radio communication network, from among allocated frequency band of 200 MHz, an 80-MHz width of frequencies from [f0] to [f0+80] MHz is used as an upward link frequency band (first upward link frequency band), and an 80-MHz width of frequencies from [f0+120] to [f0+200] MHz is used as a forward link frequency band (first forward link frequency band). A 40-MHz width of frequencies between [f0+80] and [f0+120] MHz is a transmission and reception gap (guard band). In the second radio communication network, from among allocated frequency band of 400 MHz, a 120-MHz width of frequencies from [f0] to [f0+120] MHz is used as an upward link frequency band (second upward link frequency band), a 240-MHz width of frequencies from [f0+160] to [f0+400] MHz as a forward link frequency band (second forward link frequency band), and a 40-MHz width of frequencies between [f0+120] and [f0+160] MHz as a transmission and reception gap.

In other words, the second upward link frequency band includes the entirety of the first upward link frequency band (frequencies from [f0] to [f0+80] MHz) and an upward link non-overlapping frequency band (frequencies from [f0+80] to [f0+120] MHz) differing from the first upward link frequency band. Also, the second forward link frequency band includes a part (frequencies from [f0+160] to [10+200] MHz) of the first forward link frequency band and a forward link non-overlapping frequency band (frequencies from [f0+200] to [f0+400] MHz) differing from the first forward link frequency band.

Figure 3:
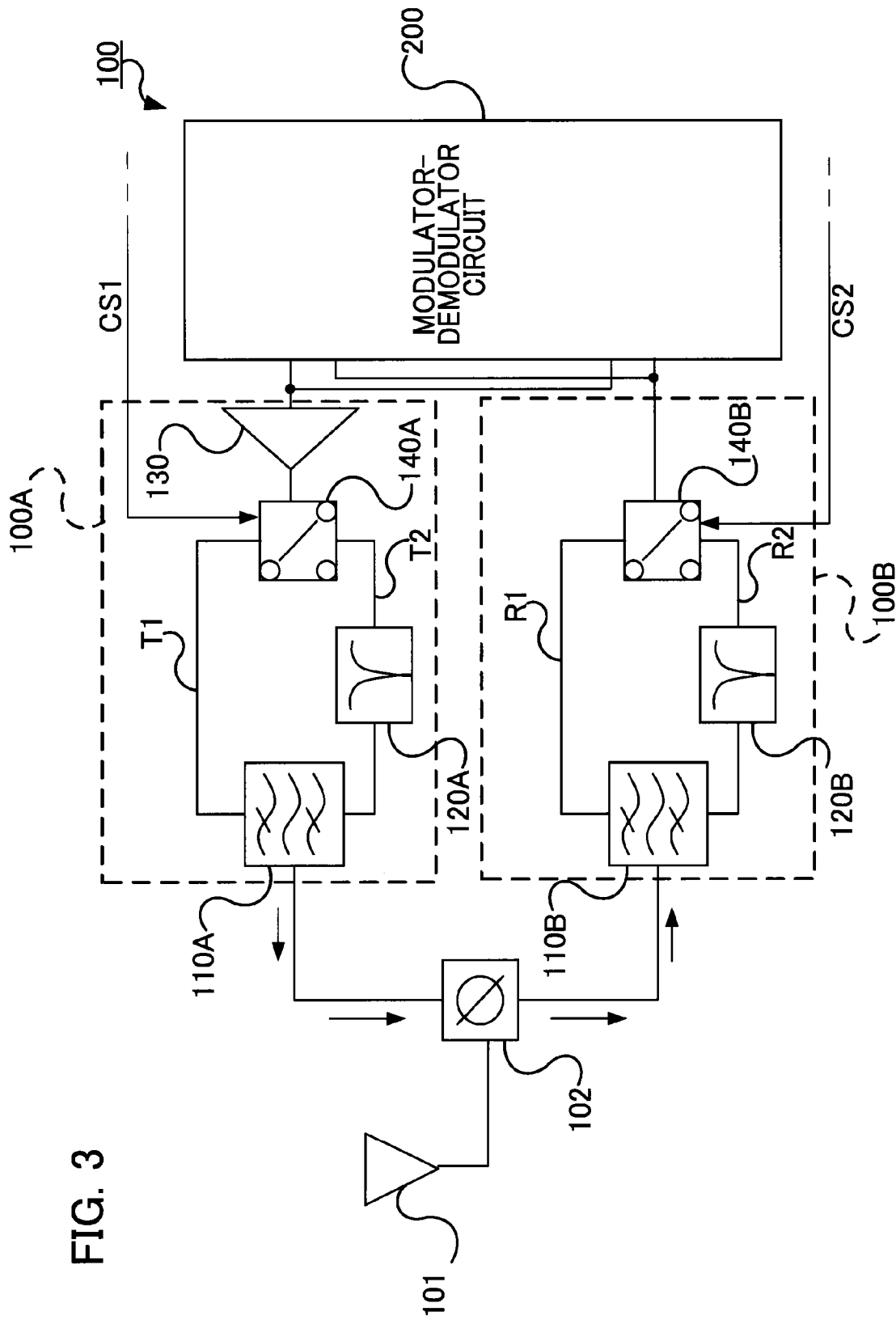
FIG. 3 is a block diagram showing a configuration of a mobile communication terminal according to an embodiment of the present invention.

FIG. 3 is a block diagram showing a configuration of a mobile communication terminal 100 according to the present embodiment. As shown in FIG. 3, mobile communication terminal 100 has a transmitting and receiving antenna 101 that wirelessly transmits an upward link modulated transmission signal (a first upward link modulated transmission signal or a second upward link modulated transmission signal), and that wirelessly receives a forward link modulated reception signal (a first forward link modulated reception signal or a second forward link modulated reception signal), a duplexer 102 that separates an input upward link modulated transmission signal and a forward link modulated reception signal, a modulator-demodulator circuit 200 capable of modulating an upward link transmission signal to generate first or second upward link modulated transmission signal and capable of generating a reception signal by demodulating a forward link modulated reception signal, a radio transmitter 100A that processes an upward link modulated transmission signal generated by modulator-demodulator circuit 200, and a radio receiver 100B that processes a forward link modulated reception signal from duplexer 102 for supply to modulator-demodulator circuit 200.

Duplexer 102 has a transmission bandpass filter and a reception bandpass filter, and separates transmission waves and reception waves depending on a frequency of a signal input from transmitting and receiving antenna 101 or radio transmitter 100A. The transmission bandpass filter has a passband corresponding to a transmission frequency and a rejectband corresponding to a reception frequency. The reception bandpass filter has a passband corresponding to a reception frequency and a rejectband corresponding to a transmission frequency.

Figure 4:
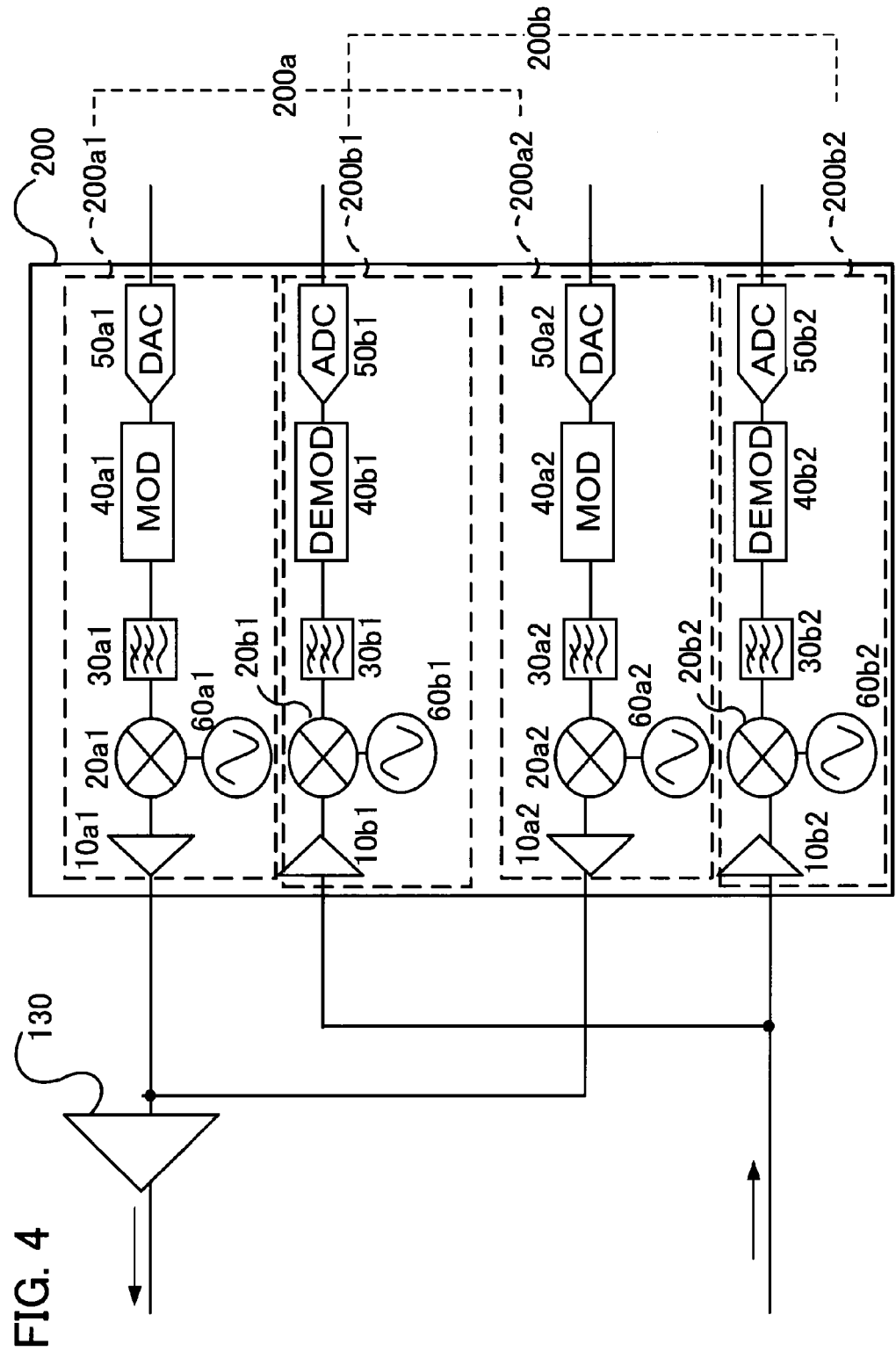
FIG. 4 is a block diagram showing a detailed configuration of a modulator-demodulator circuit of the mobile communication terminal in FIG. 3.

FIG. 4 is a diagram showing a detailed configuration of modulator-demodulator circuit 200. As shown in FIG. 4, modulator-demodulator circuit 200 has a modulation circuit 200a that has modulation circuits 200a1 and 200a2 for modulating a transmission signal and a demodulation circuit 200b that has demodulation circuits 200b1 and 200b2 for demodulating a reception signal.

Specifically, each modulation circuit 200a (200a1,200a2) has a D/A converter (DAC) 50a (50a1,50a2), a modulator (MOD) 40a (40a1,40a2), a filter 30a (30a1,30a2), a mixer 20a (20a1,20a2), an amplifier 10a (10a1,10a2), and a synthesizer 60a (60a1,60a2). In the present embodiment, a filter 30a1 is a bandpass filter that has a passband of an 80-MHz width of frequencies from [f0] to [f0+80] MHz, a filter 30a2, 30a1 is a bandpass filter that has a passband of a 120-MHz width of frequencies from [f0] to [f0+120] MHz. Furthermore, a D/A converter 50a1 has an input bandwidth of 160 MHz (in the case of double oversampling), a D/A converter 50a2 has an input bandwidth of 240 MHz (in the case of double oversampling). The input bandwidth of D/A converter 50a1,50a2 can be changed as appropriate depending on sampling rate.

With this configuration, a digital upward link transmission signal output from a baseband signal processor (not shown) that processes a baseband signal is converted to an analog transmission signal at D/A converter 50a, is quadrature-amplitude modulated (QAM) or phase-shift-keying (PSK) modulated at modulator 40a to pass through filter 30a, and is input to mixer 20a. A synthesizer 60a is connected to mixer 20a. A synthesizer 60a1 is an oscillator that oscillates a first upward link frequency belonging to a first upward link frequency band used for upward link communication in the first radio communication network, and a synthesizer 60a2 is an oscillator that oscillates a second upward link frequency belonging to a second upward link frequency band used for upward link communication in the second radio communication network. A PLL circuit synthesizer (Phase-Locked Loop circuit synthesizer) with a VCO (Voltage Controlled Oscillator) can be used as a synthesizer. In the frequency conversion, using a direct upconversion system is preferable. In the direct upconversion system, a frequency from synthesizer 60b is made almost the same as the transmission frequency to obtain a transmission signal. According to this system, a circuit configuration is made simple, and a modulation circuit can be configured with a small area.

A first upward link modulated transmission signal that has been frequency converted to a first upward link frequency at a mixer 20a1 is amplified further at an amplifier 10a1, and is input to radio transmitter 100A. A second upward link modulated transmission signal that has been frequency-converted to a second upward link frequency at a mixer 20a2 is further amplified at an amplifier 10a2, and is input to radio transmitter 100A.

Thus, modulation circuit 200a1 is capable of generating a first upward link modulated transmission signal by modulating (frequency-modulating) an upward link transmission signal with a first upward link frequency belonging to the first upward link frequency band used for upward link communication in the first radio communication network. Modulation circuit 200a2 is capable of generating a second upward link modulated transmission signal by modulating (frequency-modulating) an upward link transmission signal with a second upward link frequency belonging to the second upward link frequency band used for upward link communication in the second radio communication network.

On the other hand, each demodulation circuit 200b (200b1, 200b2) has an amplifier 10b (10b1,10b2), a mixer 20b (20b1, 20b2), a filter 30b (30b1,30b2), a demodulator (DEMOD) 40b (40b1,40b2), an A/D converter (ADC) 50b (50b1,50b2), and a synthesizer 60b (60b1,60b2). In the present embodiment, a filter 30b1 is a bandpass filter that has a passband of an 80-MHz width of frequencies from [f0+120] to [f0+200] MHz, and a filter 30b2 is a bandpass filter that has a passband of a 240-MHz width of frequencies from [f0+160] to [f0+400] MHz. An A/D converter 50b1 has an input bandwidth of 160 MHz (in the case of double oversampling), and an A/D converter 50b2 has an input bandwidth of 480 MHz (in the case of double oversampling). The input bandwidth of A/D converter 50b1,50b2 can be changed as appropriate depending on a sampling rate.

With this configuration, a first or second forward link modulated reception signal output from radio receiver 100B is input to amplifier 10b, and is amplified for input to mixer 20b. Synthesizer 60b is connected to mixer 20b. Synthesizer 60b1 is an oscillator that oscillates a reception frequency (first forward link frequency) belonging to the first forward link frequency band used for forward link communication in the first radio communication network. Synthesizer 60b2 is an oscillator that oscillates a reception frequency (second forward link frequency) belonging to the second forward link frequency band used for forward link communication in the second radio communication network. A first or second forward link modulated reception signal input to mixer 20b is frequency-converted to a baseband frequency. In the frequency conversion, using a direct upconversion system is preferable. In the direct upconversion, a frequency from synthesizer 60b is made almost the same as the reception frequency to directly obtain a baseband signal. The above-described PLL circuit is used as the synthesizer.

A frequency converted first or second reception signal passes through filter 30b, and is then input to demodulator 40b. A quadrature-amplitude modulated or phase-shift-keying modulated reception signal is demodulated (quadrature-amplitude demodulated or phase-shift-keying demodulated) at demodulator 40b, and is next converted to a digital reception signal at A/D converter 50b.

Thus, demodulation circuit 200b1 is capable of generating a first reception signal by demodulating (frequency-converting to a baseband frequency), with a first forward link frequency, a first forward link modulated reception signal modulated with a first forward link frequency belonging to the first forward link frequency band used for forward link communication in the first radio communication network. Demodulation circuit 200b2 is capable of generating a second reception signal by demodulating (frequency-converting to a baseband frequency), with a second forward link frequency, a second forward link modulated reception signal modulated with a second forward link frequency belonging to the second forward link frequency band used for forward link communication in the second radio communication network.

Radio transmitter 100A, as shown in FIG. 3, has a power amplifier 130 that amplifies the power of an upward link modulated transmission signal output from modulation circuit 200a, a switch (transmission switch) 140A that switches a path between modulation circuit 200a and transmitting and receiving antenna 101 to either a path T1 or a path T2, a transmission filter (transmission bandpass filter) 110A arranged between modulation circuit 200a and transmitting and receiving antenna 101, and a notch filter (transmission bandstop filter) 120A arranged on path T2. As shown in the figure, path T1 is a path through which an upward link modulated transmission signal output from power amplifier 130 is supplied via transmission filter 110A to transmitting and receiving antenna 101. Path T2 is a path through which an upward link modulated transmission signal output from power amplifier 130 is supplied via transmission filter 110A and notch filter 120A to transmitting and receiving antenna 101. Switch 140A switches to either path T1 or path T2 in accordance with a control signal CS1 from a controller (not shown).

The controller, in transmitting an upward link modulated transmission signal in the first radio communication network (i.e., a first upward link modulated transmission signal) generates a control signal CS1 so that a transmission signal output from power amplifier 130 passes through path T2. In transmitting an upward link modulated transmission signal in the second radio communication network (i.e., a second upward link modulated transmission signal), the controller generates a control signal CS1 so that the transmission signal passes through path T1.

FIG. 5 is a graph for explaining a frequency band passed by the transmission filter and the reception filter.

As shown in FIG. 5, transmission filter 110A can pass a frequency component belonging to a bandwidth of 120 MHz of frequencies from [f0] to [f0+120] MHz. On the other hand, notch filter 120A sharply attenuates a frequency belonging to a bandwidth of frequencies from [f0+80] to [f0+120] MHz. In the present embodiment, the notch filter is configured by forming a strip-shaped open stub circuit that extends toward a direction that is orthogonal to the direction in which path T2 is extended, having the length of one-quarter of a wavelength transmitted by path T2. Accordingly, the notch filter serves as a resonance circuit and attenuates a resonance frequency.

With this configuration, in transmitting a first upward link modulated transmission signal in the first radio communication network, a first upward link modulated transmission signal generated by modulation circuit 200a1 passes through notch filter 120A having an attenuation band of [f0+80] to [f0+120] MHz and transmission filter 110A having a passband of [f0] to [f0+120] MHz (path T2 in FIG. 3). Thus, only a first upward link modulated transmission signal belonging to the upward link frequency band of frequency [f0] to [f0+80] MHz in the first radio communication network is supplied via duplexer 102 to transmitting and receiving antenna 101. In transmitting a second upward link modulated transmission signal in the second radio communication network, a second upward link modulated transmission signal generated by modulation circuit 200a2 passes through transmission filter 110A without passing through notch filter 120A (path T1 in FIG. 3). That is, a transmission signal belonging to the upward link frequency band of frequencies from [f0] to [f0+120] MHz in the second radio communication network is supplied via duplexer 102 to transmitting and receiving antenna 101.

On the other hand, as shown in FIG. 3, radio receiver 100B has a reception filter (reception bandpass filter) 110B arranged between transmitting and receiving antenna 101 and demodulation circuit 200b, a switch (reception switch) 140B that switches a path connecting transmitting and receiving antenna 101 and demodulation circuit 200b to either a path R1 or a path R2, and a notch filter (reception bandstop filter) 120B arranged on path R2. As shown in the figure, path R1 is a path through which a forward link modulated reception signal received from transmitting and receiving antenna 101 via duplexer 102 is supplied via reception filter 110B to demodulation circuit 200b. Path R2 is a path through which a forward link modulated reception signal is supplied via reception filter 110B and notch filter 120B to demodulation circuit 200b. Switch 140B switches either to path R1 or path R2 in accordance with a control signal CS2 from the controller.

In receiving a forward link modulated reception signal (i.e., first forward link modulated reception signal) from the first radio communication network, the controller generates control signal CS2 so that this reception signal passes through path R1, whereas in receiving a forward link modulated reception signal (i.e., second forward link modulated reception signal) from the second radio communication network, the controller generates the control signal CS2 so that this reception signal passes through path R2.

As shown in FIG. 5, reception filter 110B can pass a frequency belonging to a bandwidth of 280 MHz of frequencies from [f0+120] to [f0+400] MHz. On the other hand, notch filter 120B attenuates a frequency belonging to a bandwidth of frequencies from [f0+120] to [f0+160] MHz. The basic configuration of notch filter 120B is the same as the above notch filter 120A but is different in frequency that it attenuates.

With this configuration, in receiving a forward link modulated reception signal from the second radio communication network, the reception signal passes through notch filter 120B having attenuation band of [f0+120] to [f0+160] MHz and reception filter 110B having a passband of [f0+120] and [f0+400] MHz (path R2 in FIG. 3). That is, only a forward link modulated reception signal belonging to the forward link frequency band of frequencies from [f0+160] to [f0+400] MHz in the second radio communication network is supplied to demodulation circuit 200b2. On the other hand, in receiving a forward link modulated reception signal from the first radio communication network, the reception signal passes through reception filter 110B having a band having the limits of frequency [f0+120] to [f0+400] MHz (path R1 in FIG. 3). That is, a forward link modulated reception signal belonging to the forward link frequency band of frequencies from [f0+120] to [f0+200] MHz in the first radio communication network is supplied to demodulation circuit 200b1. In this case, although reception filter 110B has a passband corresponding to a wider range of frequencies than the forward link frequency band in the first radio communication network, reception filter 110B stops a frequency of equal to or less than [f0+120] MHz. Therefore, a reception signal of a frequency belonging to the forward link frequency band of frequencies from [f0+120] to [f0+200] MHz can be received with certainty.

In general, a bandpass filter such as transmission filter 110A and reception filter 110B used in a portable phone includes a dielectric filter, a multilayer LC filter, a surface wave filter and, a BAW filter (Bulk Acoustic Wave filter) (an FBAR filter (Film Bulk Acoustic Resonator filter), in particular), etc. The dielectric filter is a block-type dielectric ceramic on which input-output terminals and plural resonators have been formed. The multilayer LC filter is one in which a low pass filter and a high pass filter are constructed by embedding an inductance element and a capacitative element inside dielectric ceramic layers. The surface wave filter is one in which interdigitated array electrode patterns for input and output are formed on two ends of a piezoelectric substrate and in which an electric signal input from the input side is converted to an electric oscillation (surface wave) that propagates on a surface of the element, the electric oscillation then being inverse transformed to an electric signal at the output electrode. The BAW filter is one that utilizes resonance of a piezoelectric membrane called a bulk acoustic wave to form a filter. An FBAR-type BAW filter has a configuration of providing an air hole to the under portion of a resonator (piezoelectric membrane) so the piezoelectric membrane to freely oscillate. In contrast, in the notch filter, because it is only sufficient to make a specific frequency sharply attenuate, the circuit configuration thereof is simpler than the bandpass filter. Especially, in the present embodiment, notch filter 120A,120B only has a stub that is projected from a transmission path (path T2). Therefore, the notch filter can be formed occupying only a small area in comparison with a case in which the bandpass filter is arranged on the substrate.

Figure 2:
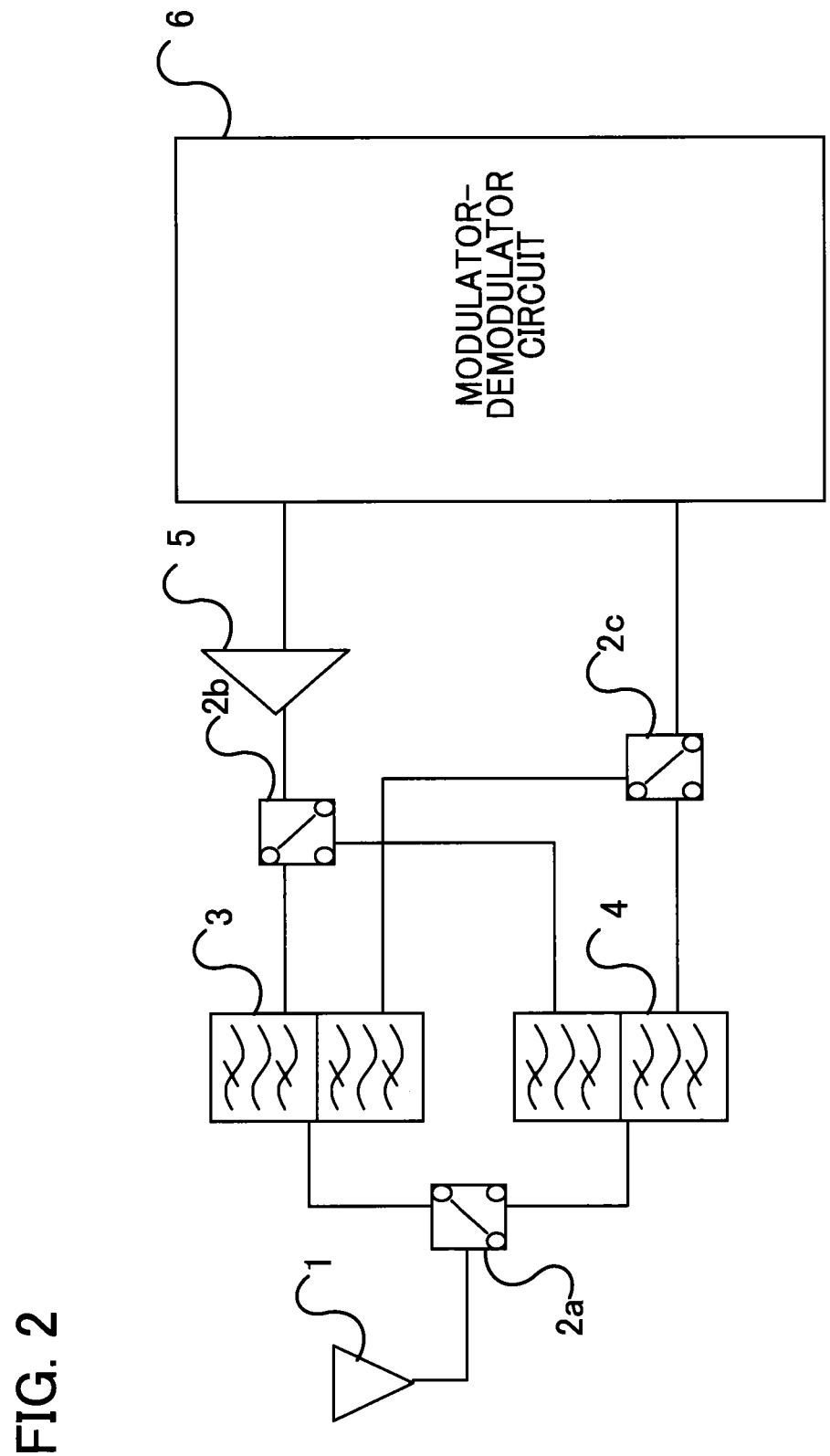
FIG. 2 is a block diagram showing a configuration of a radio station.

A high-frequency switch (switch 140A or switch 140B) includes a diode switch utilizing a switch property of diodes, a semiconductor switch, etc. Any one of those can be formed with a smaller area than a bandpass filter. Therefore, the area of a radio communication unit can be reduced by providing one transmission filter and one reception filter each to be shared by the first radio communication network and the second radio communication network and by providing switches 140A and 140B and notch filters 120A and 120B, instead of providing two transmission filters and two reception filters each as in a radio station shown in FIG. 2 or in a radio station according to Patent Document 1.

In an FDD system, because transmission and reception are simultaneously performed, distortion that arises due to nonlinearity of power amplifier 130 (nonlinear distortion) sometimes comes to be added into radio receiver 100B from radio transmitter 100A. In a case in which a noise component due to this nonlinear distortion is coupled into a frequency band for the forward link, the reception signal S/N ratio (Signal-To-Noise ratio) is degraded. In a case in which a noise component due to the nonlinear distortion is coupled into the transmission and reception gap between a frequency band for the upward link and a frequency band for the forward link, not only the degradation in the reception signal S/N ratio, but also desensitization and aliasing at an A/D converter, occur when the noise power is high.

Accordingly, in the present embodiment, as is understood from FIG. 5, in the first radio communication network, a transmission filter (transmission filter 110A and notch filter 120A) that passes frequencies from [f0] to [f0+80] MHz and that stops frequencies equal to or greater than [f0+80] MHz and reception filter 110B that passes frequencies greater than [f0+120] MHz and that stops frequencies lower than [f0+120] MHz serve as a substitution of a duplexer. Similarly, in the second radio communication network, a transmission filter 110A that passes frequencies from [f0] to [f0+120] MHz and that stops frequencies above [f0+120] MHz and a reception filter (reception filter 110B and notch filter 120B) that passes frequencies from [f0+120] to [f0+400] MHz and that stops frequencies lower than [f0+160] MHz serve as a substitution of a duplexer. With this configuration, no duplexer need be provided, and yet, intrusion of noise components into a signal belonging to a desired frequency can be cut off. Therefore, a signal can be received with a higher S/N ratio.

As described in the foregoing, according to the radio communication terminal of the present embodiment, a radio communication terminal compatible with two radio communication networks can be provided while suppressing the increase in the circuit area of a radio communication unit, in a case in which an upward link frequency band and a forward link frequency band for one of the two radio communication networks are different from those for the other of the two radio communication networks.

The present invention is not limited to the above-described embodiment and can be modified in various ways.

For example, in the above embodiment, description was given of a case in which the lower limit frequency ([f0] MHz) of the bandwidth of two frequency bands (200-MHz width and 400-MHz width) for the first radio communication network and the second radio communication network are identical and in which each frequency band is allocated in an unseparated manner, but the present invention is not limited thereto.

For example, one can assume a case in which a band for a TDD (Time Division Duplex) system is allocated in the mid portion of the frequency band of 400 MHz. In this case, an example of a bandwidth partitioning would be a configuration having an upward link frequency band of 80 MHz, a guard band of 20 MHz, a TDD of 100 MHz, a guard band of 20 MHz, and a forward link frequency band of 180 MHz. In this case, at least one of a transmission filter or a reception filter can be shared if there are overlapping parts among the 200-MHz frequency band and the 400-MHz frequency band for each of the upward link frequency band and the forward link frequency band. The same effects as the above embodiments are attainable also in this case.

Also, in the above embodiment (FIG. 4), description was given of a case in which two sets of modulation circuits 200a1,200a2 and two sets of demodulation circuits 200b1, 200b2 are provided, but it may be modified so that a set of a modulation circuit and a set of a demodulation circuit is provided. In this case, as the filter in the modulation circuit, a bandpass filter that has a passband of a 120-MHz width of frequencies [f0] to [f0+120] MHz including the frequency band of [f0] to [f0+80] MHz for the first upward link frequency band and the frequency band of [f0] to [f0+120] MHz for the second upward link frequency band is used. As the filter for the demodulation circuit, a bandpass filter that has a passband of a 280-MHz width of frequencies from [f0+120] to [f0+400] MHz including the frequency band of [f0+120] to [f0+200] MHz for the first forward link frequency band and the frequency band of [f0+160] to [f0+400] MHz for the second forward link frequency band is used. The D/A converter is one that has a 120-MHz input bandwidth (sampling rate of equal to or greater than 240 MHz), and the A/D converter is one that has a 280-MHz (sampling rate of equal to or greater than 560 MHz). In this case, the circuit area can be additionally reduced.

Alternatively, depending on the number of carrier signals to be modulated or demodulated, three or more sets of modulation circuits and three or more sets of demodulation circuits may be provided.

Additionally, in the above embodiment, D/A converter 50a provided to the upstream of modulator 40a is shown in the figure, but conversely, D/A converter 50a may be provided to the downstream of modulator 40a. Similarly, in the above embodiment, A/D converter 50*b* provided to the downstream of demodulator 40*b* is shown in the figure, but conversely, A/D converter 50*b* may be provided to the upstream of demodulator 40*b*. In this case, because quadrature-amplitude modulation (or demodulation) or phase-shift-keying modulation (or demodulation) is performed on a digital signal, a circuit configuration can be made relatively simple compared to a case in which an analog signal is modulated (or demodulated). Therefore, a circuit area can be reduced.

In the above embodiment, description was given of a case in which the bandwidth for the first radio communication network is 200 MHz and in which the bandwidth for the second radio communication network is 400 MHz, but the present invention is not limited thereto. Various bandwidths can be used depending on a bandwidth allocated in common internationally and on a bandwidth allocated for each of different countries and regions. The bandwidth partitioning within the allocated bandwidth is not limited to the above-described embodiment.

DESCRIPTION OF REFERENCE NUMERALS

10*a* (10*a*1,10*a*2), 10*b* (10*b*1,10*b*2) . . . Amplifier
20*a* (20*a*1,20*a*2), 20*b* (20*b*1,20*b*2) . . . Mixer
30*a* (30*a*1,30*a*2), 30*b* (30*b*1,30*b*2) . . . Filter
40*a* (40*a*1,40*a*2) . . . Modulator
40*b* (40*b*1,40*b*2) . . . Demodulator
50*a* (50*a*1,50*a*2) . . . D/A Converter
50*b* (50*b*1,50*b*2) . . . A/D Converter
60*a* (60*a*1,60*a*2), 60*b* (60*b*1,60*b*2) . . . Synthesizer
100 . . . Mobile Communication Terminal (Radio Communication Terminal)
100A . . . Radio Transmitter
100B . . . Radio Receiver
101 . . . Transmitting and Receiving Antenna (Transmitter Antenna, Receiver Antenna)
102 . . . Duplexer
110A . . . Transmission Filter (Transmission Bandpass Filter)
110B . . . Reception Filter (Reception Bandpass Filter)
120A . . . Notch Filter (Transmission Bandstop Filter)
120B . . . Notch Filter (Reception Bandstop Filter)
130 . . . Power Amplifier
140A . . . Switch (Transmission Switch)
140B . . . Switch (Reception Switch)
200 . . . Modulator-demodulator Circuit
200*a* (200*a*1,200*a*2) . . . Modulation Circuit (Modulation Unit)
200*b* (200*b*1,200*b*2) . . . Demodulation Circuit (Demodulation Unit)
T1,T2,R1,R2 . . . Path

The invention claimed is:

1. A radio communication terminal, comprising:
a modulation unit for generating a first upward link modulated transmission signal transmitted by a first upward link frequency belonging to a first upward link frequency band used for an upward link communication in a first radio communication network, and for generating a second upward link modulated transmission signal transmitted by a second upward link frequency belonging to a second upward link frequency band used for an upward link communication in a second radio communication network, the second upward link frequency band including an entirety of the first upward link frequency band and an upward link non-overlapping frequency band differing from the first upward link frequency band;
a transmitter antenna that transmits the first upward link modulated transmission signal and the second upward link modulated transmission signal;
a transmission bandpass filter that passes a frequency component belonging to the second upward link frequency band;
a transmission bandstop filter that attenuates a frequency component belonging to the upward link non-overlapping frequency band of the second upward link frequency band;
a transmission switch that changes a path between the modulation unit and the transmitter antenna so that the first upward link modulated transmission signal is supplied to the transmitter antenna via the transmission bandpass filter and the transmission bandstop filter during communication with the first radio communication network and so that the second upward link modulated transmission signal is supplied to the transmitter antenna via the transmission bandpass filter during communication with the second radio communication network;
a receiver antenna that receives a first forward link modulated reception signal modulated with a first forward link frequency belonging to a first forward link frequency band used for forward link communication in the first radio communication network and a second forward link modulated reception signal modulated with a second forward link frequency belonging to a second forward link frequency band used for forward link communication in the second radio communication network, the second forward link frequency band including a part of the first forward link frequency band and a forward link nor-overlapping frequency band differing from the first forward link frequency band;
a demodulation unit for generating a first reception signal by demodulating the first forward link modulated reception signal and for generating a second reception signal by demodulating the second forward link modulated reception signal;
a reception bandpass filter that passes a frequency component belonging to the first forward link frequency band and a frequency component belonging to the second forward link frequency band;
a reception bandstop filter that attenuates a frequency component belonging to the first forward link frequency band and not belonging to the second forward link frequency band; and
a reception switch that changes a path between the receiver antenna and the demodulation unit so that the first forward link modulated reception signal is supplied to the demodulation unit via the reception bandpass filter during communication with the first radio communication network and so that the second forward link modulated reception signal is supplied to the demodulation unit via the reception bandpass filter and the reception bandstop filter during communication with the second radio communication network.

2. The radio communication terminal according to claim 1, wherein at least one of the transmission bandstop filter and the reception bandstop filter is a notch filter.

* * * * *